UNITED STATES PATENT OFFICE.

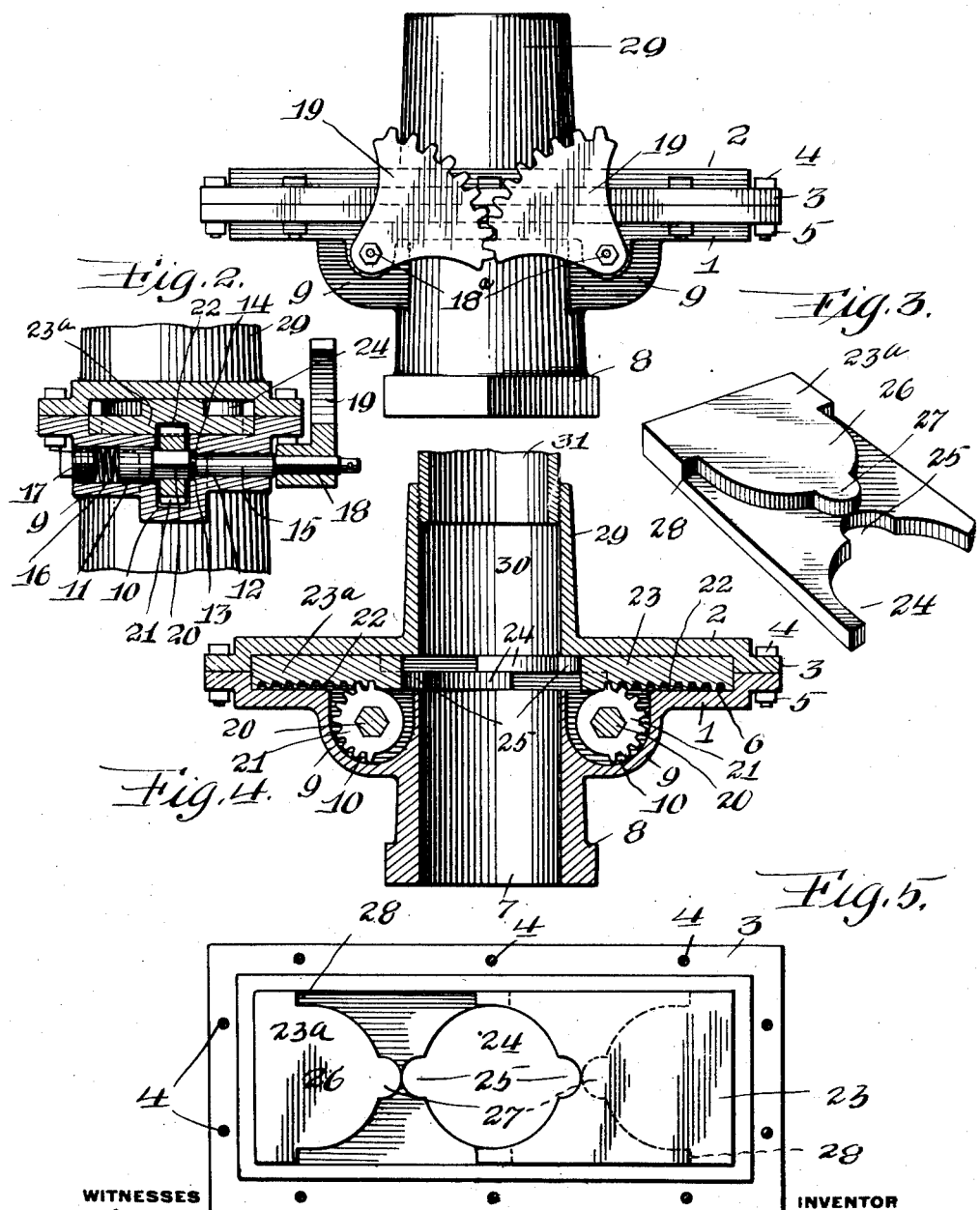

WILLIAM A. RUTH, OF AVALON, PENNSYLVANIA.

SHUT-OFF VALVE FOR OIL AND GAS WELLS.

998,400.  Specification of Letters Patent.  Patented July 18, 1911.

Application filed February 16, 1911. Serial No. 608,951.

*To all whom it may concern:*

Be it known that I, WILLIAM A. RUTH, a citizen of the United States of America, residing at Avalon, in the county of Allegheny and State of Pennsylvania, have invented certain new and useful Improvements in Shut-Off Valves for Oil and Gas Wells, of which the following is a specification, reference being had therein to the accompanying drawing.

This invention relates to a shut off valve for oil and gas wells and the primary object of my invention is to provide a novel valve for quickly closing the upper end of a well tubing or casing when oil or gas is struck by the drilling tools, thereby preventing the oil or gas from wasting until proper connections can be made with the well.

Another object of the invention is to provide a double slide valve that can be advantageously used for closing the upper end of a well tubing or casing with the drilling cable therein, the slides of the valve being constructed to snugly embrace the drilling cable and prevent a waste of oil and gas when the well "comes in".

A further object of the invention is to provide a valve of the above type that is durable, inexpensive to manufacture, easy to operate and highly efficient for the purposes for which it is intended.

With the above and other objects in view the invention resides in a novel construction, combination and arrangement of parts to be hereinafter specifically described and then claimed.

Reference will now be had to the drawing wherein there is illustrated a preferred embodiment of the invention, but it is to be understood that the structural elements thereof are susceptible to such changes as fall within the scope of the appended claims.

In the drawing:—Figure 1 is a front elevation of the valve. Fig. 2 is a cross sectional view of a portion of the same. Fig. 3 is a perspective view of one of the slides of the valve. Fig. 4 is a longitudinal sectional view of the valve, and Fig. 5 is a plan of a section of the valve body.

A valve in accordance with this invention comprises two rectangular confronting sections 1 and 2 having the edges thereof provided with flanges 3 adapted to be secured together by a plurality of bolts 4 and nuts 5. Sections 1 and 2 have the confronting faces thereof recessed to provide a rectangular valve compartment 6 and in communication with this compartment is the bore 7 of a cap 8 formed integral with the section 1.

Oppositely disposed sides of the cap 8 are provided with transverse enlargements 9 formed integral with the section 1 and said enlargements are provided with central pockets 10 in communication with the compartment 6. The enlargements 9 are furthermore provided with longitudinal bores 11, and one end of each bore is reduced, as at 12 to provide an annular seat 13 for the annular shoulder 14 of a valve stem 15 rotatably mounted in the bore of each enlargement. The valve stem 15 is normally retained upon the seat 13 by a coiled compression spring 16 arranged in the rear end of the bore 9 and retained therein by a plug 17 detachably mounted in the rear end of the bore 9. The forward end of the valve stem 15 is provided with a rectangular shank 18 and mounted upon said shank is a segment gear 19. These segment gears are adapted to mesh, as shown in Fig. 1, whereby the valve stems 15 will be moved in unison. Each of the shanks 18 is provided with a reduced portion 18ᵃ for the reception of a cotter pin to retain the sector gear 19 thereon and for the reception of a wrench to operate the valve stem.

That portion of each valve stem extending through the pocket 10 is rectangular in cross section, as at 20 and mounted upon said stem is a sector pinion or half-geared wheel 21 meshing with a rack 22 in the under side of slides 23 and 23ᵃ arranged in the compartment 6. The slides are adapted to co-operate inclosing the upper end of the bore 7, and the inner ends of the slides are constructed whereby they will interlock either to completely close the upper end of the bore 7 or to close the same with a drilling cable extending downwardly in the bore. The interlocking ends of the slides are identical but one slide is inverted relatively to the other. Each slide has the end thereof provided with a semi-circular recess 24 described upon a radius equivalent to the radius of the bore 7, whereby when the slides are open the walls of the recesses 24 will vertically aline with the walls of the bore 7. The wall of the recess 24, intermediate the ends thereof is cut away to provide a semi-circular recess 25 and the radius of this recess is adapted to correspond to the radius of the cable that extends through the bore 7.

Each slide has one face thereof cut away to provide a large semi-circular portion 26 and a small semi-circular portion 27, these portions have radii corresponding to the radii of the recesses 24 and 25 respectively. The formation of the portion 26 provides shoulders 28 against which the inner ends of the slides abut when the slides are closed, the small portion 27 of the slide 23ª fitting into the recess 25 of the slide 23 and the large portion 26 of the slide 23ª fitting into the recess 24 of the slide 23, and vice versa.

The valve section 2 is provided with a vertical nipple 29 having the bore 30 vertically alining with the bore 7 to the cap 8. An outlet pipe 31 can be easily connected to the nipple 29.

The cap 8 is adapted to be mounted upon the upper end of a well casing or tubing, and with the slides 23 and 23ª open the ordinary drilling operations can be carried on in the well. Should oil or gas be struck one of the valve stems 15 can be rotated to shift the slides 23 and 23ª inwardly to snugly embrace the drilling cable and prevent the oil and gas from wasting. The drilling cable can be raised until the drilling tools encounter the slides 23 and 23ª and then the slides can be opened to allow the drilling tools to pass out and then again close. The outlet pipe 31 can then be connected to the nipple and assuming that this pipe is connected to a tank or suitable reservoir, the slides can be opened.

From the foregoing it will be observed that I have devised a novel double slide valve having the slides thereof constructed to coöperate in closing the valve body. The valve is non-leakable and the parts thereof can be readily assembled.

What I claim is:—

1. A valve of the type described comprising a sectional body, interlocking slides arranged in said body, and means including valve stems and sector gears adapted to move said slides in unison.

2. A valve of the type described comprising a body, slides arranged in said body and having the ends thereof constructed to interlock and close said valve, and means including valve stems and sector gears adapted to move said slides back and forth in said body.

3. A valve of the type described comprising a body, a cap carried thereby and in communication with said body, interlocking slides arranged in said body and adapted to be shifted to close the upper end of said cap, and means including sector gears adapted to shift said slides in unison.

4. A valve of the type described comprising a sectional body, a cap carried by one section thereof and in communication with said body, a nipple carried by the other section of said body and vertically alining with said cap, slides arranged in said body and adapted to be shifted to shut off the communication between said cap and said nipple, and means including valve stems and sector gears adapted to shift the slides.

5. A valve of the type described comprising a sectional body having a compartment formed therein, a cap carried by said body and in communication with the compartment thereof, a nipple carried by said body and in communication with the compartment thereof, slides arranged in the compartment of said body and having the ends thereof constructed to interlock and control the communication between said cap and said nipple, and means including racks, sector gears and valve stems adapted to shift said slides.

In testimony whereof I affix my signature in the presence of two witnesses.

WILLIAM A. RUTH.

Witnesses:
 MAX H. SROLOVITZ,
 CHRISTINA T. HOOD.